United States Patent
Fong et al.

(10) Patent No.: US 8,436,630 B2
(45) Date of Patent: May 7, 2013

(54) CORRECTED OPTICAL SPECTRAL RESPONSES FOR PHOTOELECTRIC DEVICES

(75) Inventors: Alexandre Y. Fong, Orlando, FL (US); Christopher N. Pannell, Orlando, FL (US); Robert Bronson, Jr., Longwood, FL (US)

(73) Assignee: Gooch and Housego PLC, Somerset (GB)

( * ) Notice: Subject to any disclaimer, the term of this patent is extended or adjusted under 35 U.S.C. 154(b) by 374 days.

(21) Appl. No.: 12/903,633

(22) Filed: Oct. 13, 2010

(65) Prior Publication Data
US 2011/0084717 A1   Apr. 14, 2011

Related U.S. Application Data

(60) Provisional application No. 61/251,364, filed on Oct. 14, 2009.

(51) Int. Cl.
*G01R 31/00*   (2006.01)
(52) U.S. Cl.
USPC ............. 324/750.01; 356/239.3; 356/445; 356/447; 351/246
(58) Field of Classification Search ............ 324/750, 324/754, 756; 356/328, 330, 432, 434, 239.3; 356/445; 359/206, 213, 224; 362/327, 332; 372/26; 250/205, 226, 228; 313/116; 351/246
See application file for complete search history.

(56) References Cited

U.S. PATENT DOCUMENTS

| | | | |
|---|---|---|---|
| 5,061,049 A | 10/1991 | Hornbeck | |
| 5,966,212 A * | 10/1999 | Hendler et al. | 356/239.3 |
| 6,128,078 A | 10/2000 | Fateley | |
| 6,788,416 B2 * | 9/2004 | Reuter | 356/445 |
| 7,019,883 B2 * | 3/2006 | Moon et al. | 359/290 |
| 7,553,022 B2 * | 6/2009 | Neal et al. | 351/246 |
| 8,208,144 B2 * | 6/2012 | Palumbo | 356/432 |
| 2008/0259318 A1 * | 10/2008 | Pan et al. | 356/73 |

OTHER PUBLICATIONS

Joseph P. Rice, et al., "A Method for Testing the Spectral Responsivity of Infrared Cameras Using Tunable Lasers" Optical Technology Division, National Institute of Standards and Technology, Gaithersburg, MD, Proceedings of SPIE vol. 5076, 2003.

* cited by examiner

*Primary Examiner* — Patrick Assouad
*Assistant Examiner* — Sean Curtis
(74) *Attorney, Agent, or Firm* — Jetter & Associates, P.A.

(57) ABSTRACT

A system for measuring an optical spectral response of a photoelectric DUT includes a spectrally programmable light source including a broadband light source, a dispersive element for dispersing the light, and a spatial light modulator for controlling an intensity and a spectra of the light to provide a spectrally programmable light beam. A light distributing device is coupled to receive the spectrally programmable light beam and includes a light distributing structure for distributing the spectrally programmable light beam in a known ratio to a first area and a second area. A reference detector is positioned at the first area, and the DUT is positioned at the second area. Data acquisition electronics and a processor receive simultaneously generated output signals from the DUT and the reference detector to correct for intensity variation in the spectrally programmable light beam in determining the optical spectral response of the DUT.

13 Claims, 2 Drawing Sheets

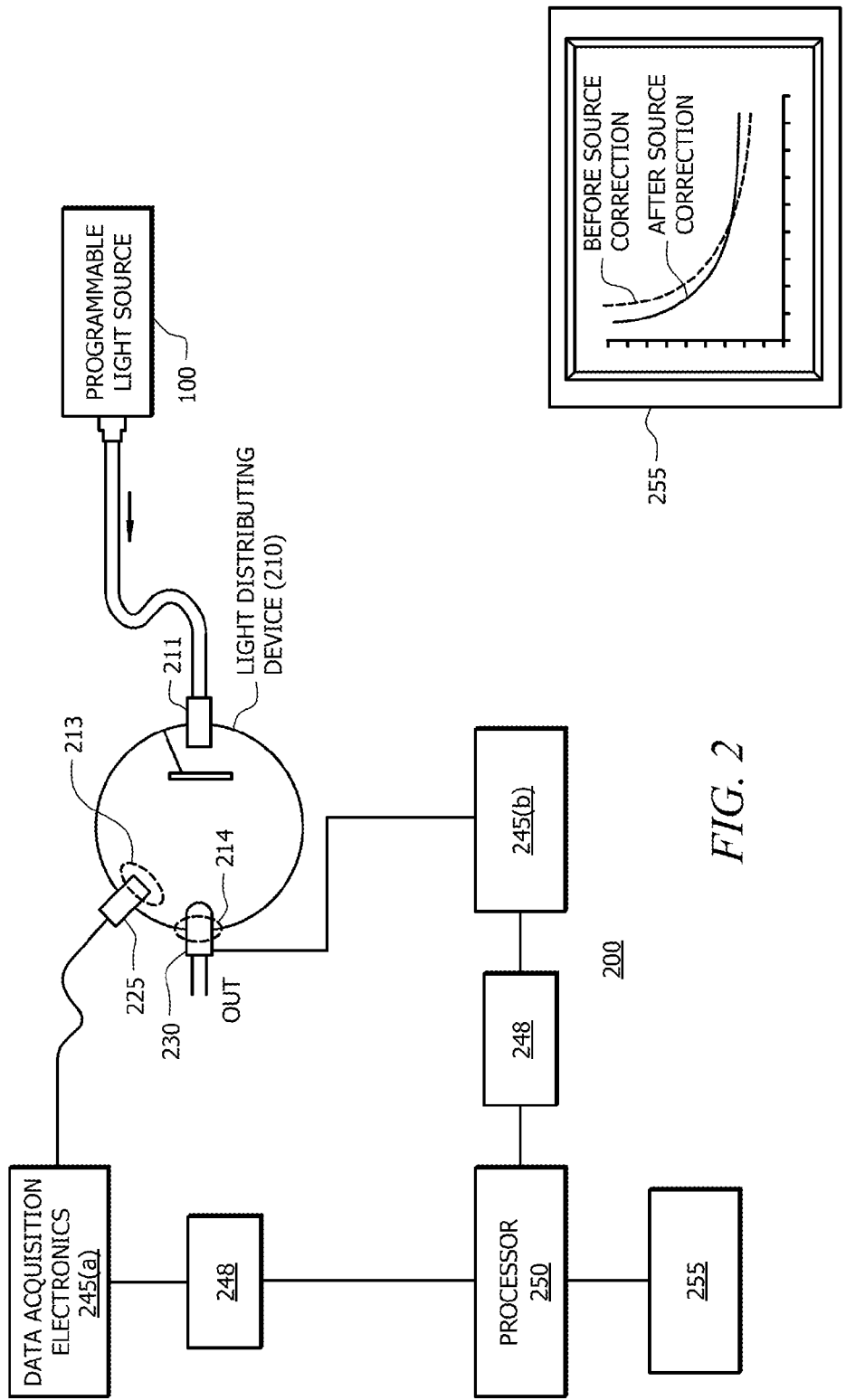

CORRECTED OPTICAL SPECTRAL RESPONSES FOR PHOTOELECTRIC DEVICES

CROSS REFERENCE TO RELATED APPLICATIONS

This application claims the benefit of Provisional Application Ser. No. 61/251,364, entitled "CORRECTED OPTICAL SPECTRAL RESPONSES FOR PHOTODETECTORS", filed Oct. 14, 2009, which is herein incorporated by reference in its entirety.

FIELD

Disclosed embodiments relate to characterization of the optical spectral response of photoelectric devices, such as photovoltaic (PV) devices.

BACKGROUND

Photoelectric devices generate an electrical signal in response to received electromagnetic radiation, such as visible, infrared, or ultraviolet radiation. Photodetectors such as CCDs, photodiodes, phototransistors, focal plane arrays, and photovoltaic (PV) cells are all examples of photoelectric devices.

Accurate characterization of the optical spectral response of photoelectric devices is needed for certain applications, for example, for solar applications. In solar applications, knowledge of PV conversion efficiencies is important in determining and expanding their performance across a wider spectral range. For example, developments in new materials that can absorb light from the ultraviolet through the infrared offer unforeseen possibilities in terms of conversion efficiencies and applications. Accurate characterization of the electrical response of the PV devices for such materials is often central to this objective.

As commonly used, the term "solar cell" is reserved for devices intended specifically to capture energy from natural sunlight, while the term PV cell is used when the light source is unspecified. A primary parameter describing the performance of a solar cell device is the power-conversion efficiency, as evidenced by the Watt-peak rating. The most common procedure employed to characterize a solar cell device is the current-voltage (I-V) response under simulated sunlight illumination. By knowing the incident power, the power-conversion efficiency of the device can be calculated.

The short-circuit current density (Jsc) is a measure of the photocurrent arising with no external bias applied with the device electrodes connected via an external circuit. The open-circuit voltage (Voc) represents the necessary externally applied voltage for which no net current passes through the solar cell device. The point along the I-V response curve at which the product of the voltage and current provides a maximum is the point of maximum power and represents the optimal output driving load for the solar cell device. However, in addition to the intensity of the illumination source, it is important to account for the spectrum of the illumination source and its difference from the standard solar spectrum to obtain the "true" power efficiency of the solar cell device.

A reference cell is commonly used to establish the intensity of the illumination source used for testing. However, there may be error in the measured Jsc of the test device arising from differences in the spectrum provided by the illuminator and/or differences in the spectral response of the reference cell and the PV device under test, (PV-DUT), such as a solar cell.

The spectral response of a PV-DUT is generally measured by exposing the PV-DUT to monochromatic light that is scanned through the wavelength range of interest. The amount of output signal (e.g., output power) resulting from exposure to the monochromatic light at each wavelength increment is first measured with a standard (reference) photodetector having a known photoelectric response in a light path, and then the PV-DUT is placed in the same light path. The signal from the PV-DUT divided by the amount (power) of light obtained from the reference photodetector is the response of the PV-DUT. The monochromatic source is typically a scanning grating monochromator. A scanning monochromator uses precision mechanics and slits to select specific wavelengths dispersed by gratings from a broadband spectrum.

The resulting power of monochromatic light from such a source is very small. It has also been observed that many solar cell devices respond differently at high light levels as compared to low light levels. While it is impractical to generate tunable monochromatic light spanning the visible spectrum (and beyond) at the same brightness as the sun under this method, a broadband or "white light bias" source can be used to simulate a bright environmental condition. This is a constant light source that raises the overall energy level in the test sample to approximate internal conditions representative to the measure of the solar cell's spectral performance regime under real world conditions.

SUMMARY

Disclosed embodiments describe systems and methods for measuring the spectral response of a photoelectric DUT that provide source corrected optical spectral responses. The Inventors have recognized that source correction is needed in certain applications because the output of even high quality light sources may significantly vary in intensity over both time and temperature. Accordingly, in disclosed embodiments, an output from a reference photoelectric device of known response responsive to light from the light source is simultaneously generated while the testing the photoelectric DUT takes place. As used herein "simultaneously generated" includes the respective measurements being generated within a time range of $\leq 100$ msec.

A spectrally programmable light source provides a spectrally programmable light beam comprising in optically coupled sequence a broadband light source for emitting light, a dispersive element for dispersing the light, and a spatial light modulator for controlling an intensity and a spectra of the light to provide the spectrally programmable light beam. As used herein, broadband light source is a light source that produces a broad and continuous spectrum of frequencies, which generally includes the full visible spectrum and at least a portion of at least one other band, which may be contrasted with a conventional laser, which produces a single frequency or very narrow range (e.g., <1 nm) of frequencies. Moreover, as used herein, a "spectrally programmable light source" is defined as a light source that includes a broadband light source that is user programmable and digitally controlled for both brightness (intensity) and color (selectable spectra, including monochromatic band passes and complete spectral profiles or continua) band, where the color and brightness level can be generally both be changed rapidly, such as in <1 μsec.

A light distributing device having at least one input portion is coupled to receive the spectrally programmable light beam and includes a light distributing structure for distributing the spectrally programmable light beam in a known ratio to a first area and to at least second area. A reference detector is positioned at the first area, and the photoelectric DUT is positioned at the second area.

The system can include data acquisition electronics and a processor coupled to the reference output and the DUT for receiving simultaneously generated output signals from the DUT and reference detector. In this embodiment the processor uses output signals from the reference detector to correct for intensity variation in the spectrally programmable light beam to generate a corrected optical spectral response for the photoelectric DUT.

BRIEF DESCRIPTION OF THE DRAWINGS

FIG. 2 is block diagram depiction of a system for measuring an optical spectral response of a photodetecting or PV DUT that is corrected for source intensity variance, according to a disclosed embodiment.

FIG. 3 shows example parametric output traces displayed on a display device including a photoelectric parameter obtained from a photoelectric DUT before source correction and the same parameter after source correction as disclosed herein.

DETAILED DESCRIPTION

Figure 1:
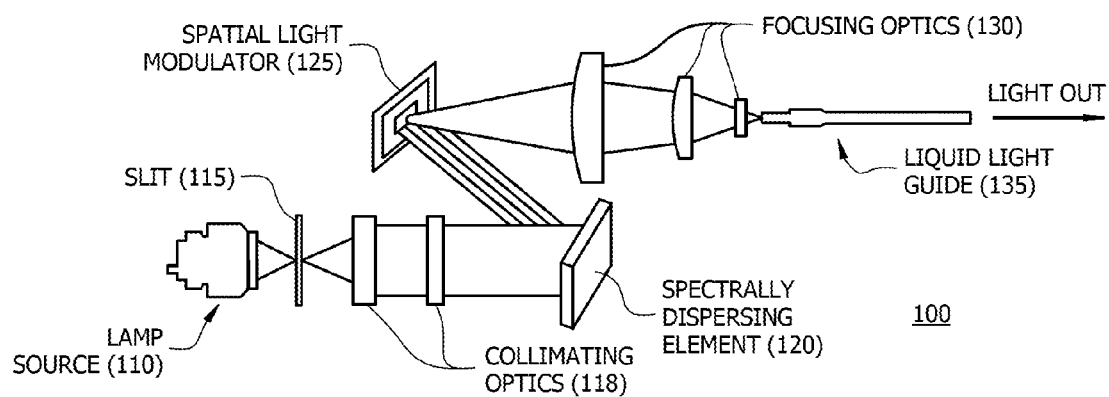
FIG. 1 is a schematic showing an example spectrally programmable light source that can be used with disclosed embodiments.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this Disclosure.

The Inventors herein have recognized that under typical operating conditions, photoelectric devices contend with varying illumination. For example, solar cell devices experience solar emissions whose spectral continua vary in profile and intensity depending upon variables including cloud conditions, the time of day and geographical region of installation (i.e. tropical sunset, midday desert sun, sunrise in the North Atlantic, etc.). Thus, it is desirable to characterize a given photoelectric device under a variety of operational scenarios as accurately as possible. The Inventors herein have also recognized gross optical spectral response approximations created by conventional techniques described above may not elicit the response observed in such cases. Systems including high resolution spectrally programmable light source capable of simulating such conditions are disclosed herein for addressing this unmet need.

For characterizing solar cells, a high resolution spectrally programmable light source can be programmed to reproduce and apply a large variety of solar spectral conditions to the solar cell for assessment of its responsivity or electrical production under such scenarios. This information can be of significant value to developers and producers of such solar devices for improving their yield performance. For example, the OL 490 AGILE LIGHT SOURCE provided by Optronic Laboratories, Orlando, Fla., a subsidiary of Gooch & Housego PLC, is a digitally programmable light source. The OL 490 utilizes micro-electro-mechanical (MEMS) technology, more specifically digital micro-minor devices (DMDs). DMDs are commercially available under the trade name of Digital Light Processing (DLP®) from Texas Instruments Corporation, Dallas, Tex.

FIG. 1 is a schematic showing a spectrally programmable light source 100 that can be used with disclosed embodiments. One example of a spectrally programmable light source 100 that can be used with disclosed embodiments is based on the spectrally programmable light source disclosed in U.S. Pat. No. 6,128,078 to Fateley, et al. ("Fateley"). Fateley is hereby incorporated by reference in its entirety into this Disclosure. Spectrally programmable light source 100 includes a broadband light source shown as a lamp source 110 that provides light in the full spectral range of interest. For photoelectric devices such as PV devices, the spectral range of interest generally includes the visible through near infrared regions of the optical spectrum (e.g., 380 nm to 1.6 µm), and can also include a portion of the ultraviolet (e.g., 100 to 380 nm). Lamp source 110 can comprise, for example, a xenon or quartz tungsten halogen lamp for the UV-VIS-NIR region. The light from lamp source 110 is introduced to a slit 115 which imparts spatial coherency to its distribution across a spectrally dispersive element 120 such as the grating shown in FIG. 1. Spectrally dispersive element 120 embodied as a grating can comprises a concave diffraction grating. Spectrally dispersive element 120 can also comprise a prism. Collimating optics 118 is shown between the lamp source 110 and the spectrally dispersive element 120.

Components of interest from the emergent spectrally dispersed output from the spectrally dispersive element 120 and their desired intensity are selected by a spatial light modulator 125, such as a DMD. In one embodiment the DMD can comprise a digitally controlled MEMS 2D micro-mirror array for providing a programmable light beam that provides both spectral and intensity programmability.

A light source such as spectrally programmable light source 100 can be programmed to reproduce and apply a large variety of solar spectral conditions to a photoelectric DUT for assessment of its responsivity or electrical production under such scenarios. As noted above, this information can be of significant value to developers and producers of devices such as solar cells for improving their yield performance.

A typical configuration including a spatial light modulator 125 embodied as a DMD distributes the spectral dispersion along the lateral plane of the DMD. The light intensity is varied by increasing or decreasing the population of the vertical plane of DMD elements or pixels across a desired bandpass. One such micro-mirror array to implement a DMD is disclosed in U.S. Pat. No. 5,061,049 to Hornbeck, Texas Instruments Corporation, Dallas, Tex., which is hereby incorporated herein by reference. As disclosed in Hornbeck, the micro-minor array includes a semiconductor chip or piezoelectric device having an array of small reflecting surfaces thereon that act as minors. Those having ordinary skilled in the art will appreciate that other spatial light modulators 125 such as a magneto optic modulator or a liquid crystal device (LCD) may be used instead of a DMD. The output from spatial light modulator 125 is focussed by focusing optics 130, which is coupled to a light guide 135, such as the liquid light guide 135 shown in FIG. 1.

The Inventors have recognized that since lamp sources and other optical elements in digitally programmable light sources 100 such as the OL 490 can vary in intensity over time and temperature, monitoring simultaneously generated outputs from the digitally programmable light source with a reference photoelectric device of known response while testing the photoelectric DUT is disclosed in embodiments described herein. Such monitoring permits source corrected optical spectral responses for photodetector DUTs to be obtained, wherein the source correction comprises correction for source intensity variance. In a typical embodiment, a reference detection device of similar composition to the photoelectric DUT (e.g., both being silicon based) but of known spectral response characteristics monitors the light output from the digitally programmable light source simultaneously as the photoelectric DUTs output (e.g., voltage or current) is being recorded. As described below, data (e.g., intensity data from measured electrical data using a known photoelectric response) obtained from the reference photoelectric device during DUT measurements allows correction for source intensity variance so that a source corrected DUT response can be obtained.

FIG. 2 shows a block diagram depiction of a system 200 for measuring an optical spectral response of a photoelectric DUT that is corrected for source intensity variance, according to a disclosed embodiment. System 200 comprises a light distributing device 210 for distributing incident light in a known ratio to a first area shown as spatial location 213 and at least a second area shown as spatial location 214. Light distributing device 210 is shown in FIG. 2 as a light integrating sphere which provides a ratio of nearly 1, as does an integrating square. As known in the art, light integrating sphere includes baffling that is configured to uniformly distribute the programmable light beam to spatial location 213 and spatial location 214, and thus to reference detector 225 and photoelectric DUT 230.

Light distributing device 210 is not limited to integrating spheres or squares since it is not necessary for light distributing device 210 to provide an equal light distribution, just to provide a known ratio of measurement to reference light. For example, significantly more light may be desirable in the measurement location having the DUT 230 (shown as spatial location 214 in FIG. 2) if the reference detector 225 (shown as spatial location 213 in FIG. 2) has a high sensitivity.

The spectrally programmable light source in FIG. 2 shown as the spectrally programmable light source 100 in FIG. 1 provides the incident light to entrance port 211 of integrating sphere 210. As described above, spectrally programmable light source 100 includes in optically aligned sequence a lamp or broadband light source 110, slit 115, collimating optics 118, a wavelength dispersive device 120 such as a grating, spatial light modulator 125, focusing optics 130 and a light guide 135.

Reference detector 225 and DUT 230 are both connected to respective data acquisition electronics 245(a) and 245(b), respectively (e.g., including an analog-to-digital (A/D) converter, filter(s), amplifier and metering electronics), which can alternatively be embodied using different channels of a single multi-channel detector electronics apparatus. A processor (e.g., a digital signal processor (DSP)) 250 receives output signals originating from reference detector 225 and DUT 230 via an interface 248, such as a USB/computer interface following signal measurement and conditioning by data acquisition electronics 245(a) and (b).

In operation, the spectral programmable light source 100 can generate both monochromatic band-passes and complete spectral profiles or continua as described above statically or in rapid sequence, such as is enabled by digital control provided by DMD technology. The simultaneously generated output signals from DUT 230 and reference detector 225 after signal measurement and conditioning by data acquisition electronics 245(b) and (a), respectively, are monitored by processor 250 via interface 248 (e.g., USB), and can include data logging. Voltage and current measurements from DUT 230 (LIV, Jsc for PV DUTs) may also be collected. The processor 250 uses output signals from the reference detector 225 along with the stored known photoelectric optical spectral response of the reference detector 225 (generally over a band of interest) to derive actual source intensity data that can be used to correct for intensity variations in the programmable light beam in determining the source intensity corrected optical spectral response of the photoelectric DUT 230.

Processor 250 in FIG. 2 outputs processed data to display device 255. FIG. 3 shows example parametric output traces displayed on a display device including a photoelectric parameter obtained from DUT 230 before source correction and the same parameter after source correction as disclosed herein. The methodology and systems described herein allow not only evaluation of spectral response via sequential exposure of monochromatic band-passes but also entire broadband continua allowing more accurate determination of conversion efficiencies of photoelectric including PV devices under real world conditions than previously known.

An exemplary method is now described using a spectrally programmable light source described as the OL 490 in a system configuration such as system 200 shown in FIG. 2 to provide corrected photoelectric DUT spectral response characterization measurements. The photoelectric DUT can comprise single and multi-element PV, photodetectors, focal plane arrays, photosensitive and imaging devices. A wide range of operating conditions can be obtained by simulating broadband lighting conditions (i.e. photovoltaic solar cell in tropical sunset, midday desert sun, sunrise in the North Atlantic, etc.) using a spectrally programmable light source such as the OL 490.

As described above, the OL 490 can provide a mono or polychromatic light source, and is capable of white light biasing. A light distributing device such as an integrating sphere makes the output illumination uniform over two or more exit ports on the sphere and the intensities at these ports are in a known ratio or ratios (e.g., ratio=1 for a conventional integrating sphere). Simultaneously taken reference detector measurements decreases the scanning process and corrects for source variance/instability, and can also correct for the integrating device (e.g., sphere or cube) or more generally the light distributing device response. The measurement system can be under the control of a computer, e.g., using the LABVIEW graphical interface. Data acquisition electronics 245 (a) and (b) coupled to a processor 250 can provide simultaneous data acquisition from both the DUT and the reference detector. For PV DUTs, the OL 490 can simulate a solar profile and a system such as system 200 can perform LIV and Jsc measurements. As disclosed above, More accurate results are generally obtained when the reference detector 225 is the same type as the photoelectric DUT (i.e. both are silicon-based).

Disclosed embodiments can utilize lock-in amplification and detection to suppress noise. As known in the art, a lock-in amplifier takes the input signal, multiplies it by a reference signal (either provided from the internal oscillator or an external source), and integrates it over a specified time, usually on the order of milliseconds to a few seconds. The resulting signal is an essentially DC signal, where the contribution from any signal that is not at the same frequency as the reference signal is attenuated essentially to zero, as well as the out-of-phase component of the signal that has the same frequency as the reference signal (because sine functions are orthogonal to the cosine functions of the same frequency).

For example, digital control of the spatial light modulator 125 embodied as a DMD in spectrally programmable light source 100 source can be used to apply modulated output spectra or to only modulate portions of the spectra emitted. Such modulation coupled with lock-in amplification techniques can be used to improve measured signal to noise by suppressing noise sources, such as noise originating from spurious environmental conditions. For example, the spectrally programmable light source 100 may be frequency modulated and the data processing provided by processor 250 can comprise lock-in signal processing. A basic lock-in amplification example comprises modulating the light source at a frequency not found in nature such that the DUT data collection electronics only the signal at that frequency.

As described above, the active areas of the DUT 230 and reference detector 225 are both placed into a light distributing device such as an integrating sphere where the distribution of light is sufficiently, equally and evenly distributed between both devices, or is at least in a known ratio. The OL 490 or other spectrally programmable light source can be programmed to either scan across desired band-passes or generate spectrally accurate depictions of the broadband conditions the device is to be operated under. As the OL 490 or other spectrally programmable light source illuminates the DUT 230, electrical response measurements from the DUT 230 and the reference detector 225 are both simultaneously recorded and indexed with respect to the band-pass or spectral profile being generated.

The voltage and/or current (LIV, Jsc) measurements from the DUT 230 can be collected in the case of a PV DUT. As described above, modulation and lock-in techniques may be applied as required to improve signal to noise in the resulting data. Software can automate the process coordinating the OL 490 or other spectrally programmable light source 100 and data acquisition from both the DUT 230 (or multiple DUTs) and the reference detector 225. If the DUT 230 is to be evaluated under more than a single spectral profile or series of band-passes, a sequence of such measurements can be applied. After the scan or sequence of profiles and scans are complete, measurement data from the DUT 230 and reference detector 225 are processed by a processor 250 that as described above obtains a measure of the actual source intensity illuminating the DUT 230 to generate corrected DUT data that includes correction for variations in the intensity from the spectrally programmable light source 100. The resulting corrected DUT data can be used to more precisely evaluate the DUT under the above stated illumination conditions.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

We claim:

1. A system for measuring an optical spectral response of a photoelectric device under test (DUT), comprising:
   a spectrally programmable light source providing a spectrally programmable light beam comprising in optically coupled sequence a broadband light source for emitting light, a dispersive element for dispersing said light, and a spatial light modulator for controlling an intensity and a spectra of said light to provide said spectrally programmable light beam;
   a light distributing device having at least one input portion coupled to receive said spectrally programmable light beam and a light distributing structure for distributing said spectrally programmable light beam in a known ratio to a first area and at least a second area, and
   a reference detector having a reference output positioned at said first area, wherein said photoelectric DUT is positioned at said second area.

2. The system of claim 1, further comprising data acquisition electronics and a processor coupled to said reference output and an output of said photoelectric DUT for receiving simultaneously generated output signals from said photoelectric DUT and said reference detector, said processor using said output signals from said reference detector to correct for intensity variation in said spectrally programmable light beam in determining said optical spectral response of said photoelectric DUT.

3. The system of claim 1, wherein said light integrating device comprises an integrating sphere.

4. The system of claim 1, wherein said spatial light modulator comprises a digital micromirror array.

5. A system for measuring an optical spectral response of a photoelectric device under test (DUT), comprising:
   a spectrally programmable light source providing a spectrally programmable light beam comprising in optically coupled sequence a broadband light source for emitting light, a dispersive element for dispersing said light, and a spatial light modulator for controlling an intensity and a spectra of said light to provide said spectrally programmable light beam;
   a light distributing device having at least one input portion coupled to receive said spectrally programmable light beam and a light distributing structure for distributing said spectrally programmable light beam in a known ratio to a first area and at least a second area;
   a reference detector having a reference output positioned at said first area;
   wherein said photoelectric DUT is positioned at said second area, and
   data acquisition electronics and a processor coupled to said reference output and an output of said photoelectric DUT for simultaneously receiving output signals from said photoelectric DUT and said reference detector, said processor using said output signals from said reference detector to correct for intensity variation in said spectrally programmable light beam in determining said optical spectral response of said photoelectric DUT.

6. A method of characterizing a photoelectric device under test (DUT), comprising:
   distributing a programmable light beam from a spectrally programmable light source into a known ratio to at least a first area occupied by said photoelectric DUT and a second area occupied by a reference photodetector;
   coupling an output of said photoelectric DUT and an output of said reference photodetector to a processor for data processing, wherein said processor receives a simultaneously generated output signal from said photoelectric DUT and an output signal from said reference photodetector;
   wherein said processor uses said output signal from said reference photodetector together with a photoelectric response of said reference photodetector to correct for time-varying intensity fluctuations in said programmable light beam to determine a corrected optical spectral response for said photoelectric DUT.

7. The method of claim 6, wherein said photoelectric DUT comprises a solar cell, said programmable light beam comprises a simulated solar illumination and said corrected optical spectral response for said solar cell includes a corrected illuminated current-voltage (LIV) and a corrected short circuit current density (Jsc).

8. The method of claim 7, wherein said simulated solar illumination includes a plurality of seasonal, longitudinal and temporal conditions under a plurality of static and changing natural lighting conditions including sunrise and sunset.

9. The method of claim 6, wherein said photoelectric DUT comprises a single or multi-element photovoltaic, photodetector, focal plane array, photosensitive device or imaging device.

10. The method of claim 6, further comprising modulating said spectrally programmable light source and said data processing comprises lock-in signal processing.

11. The method of claim 6, wherein said reference detector and said photoelectric DUT comprise a common substrate composition.

12. The method of claim 11, wherein said common substrate composition comprises silicon.

13. The system of claim 1, wherein said light distributing structure simultaneously distributes said spectrally programmable light beam in said known ratio to said first area and at least said second area.

* * * * *